June 24, 1930. J. L. DRAKE 1,767,123
GLASS SURFACING APPARATUS
Filed May 4, 1926
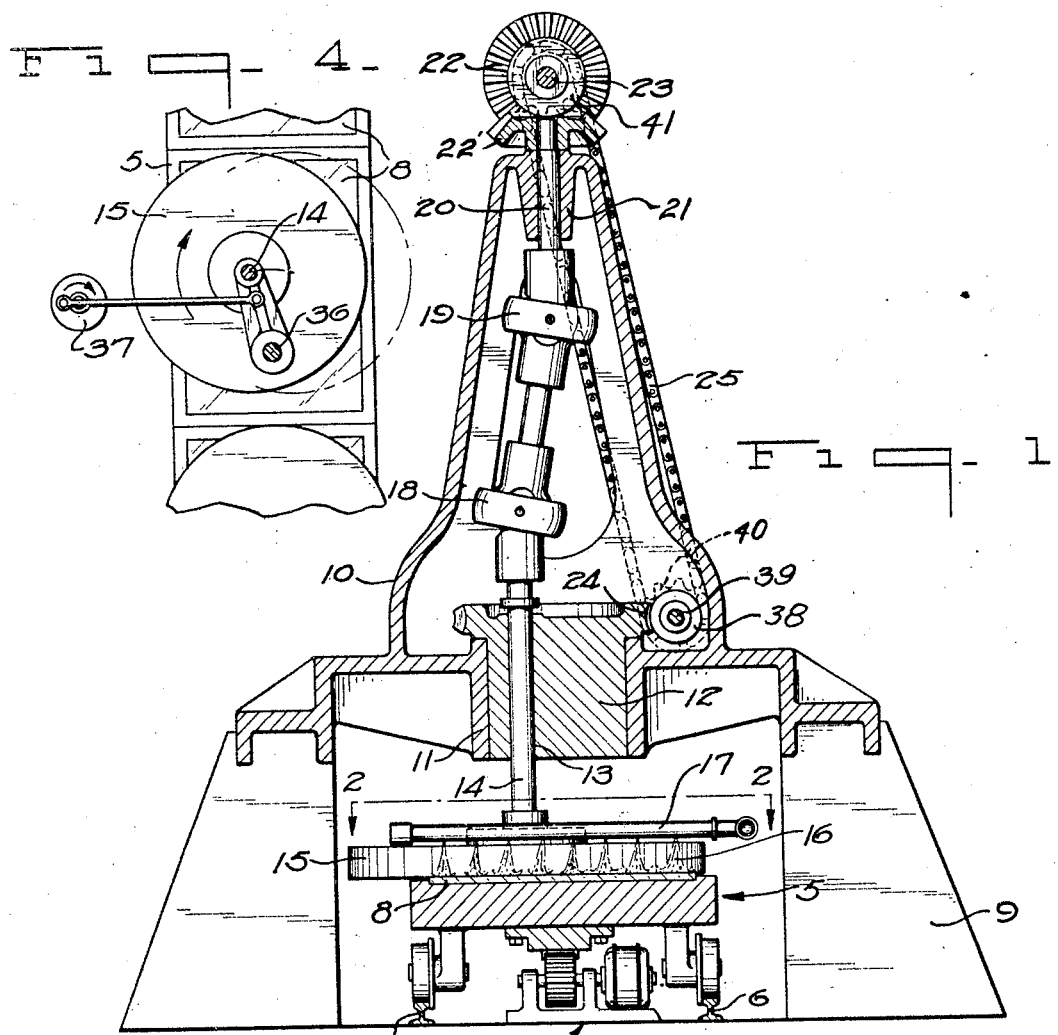
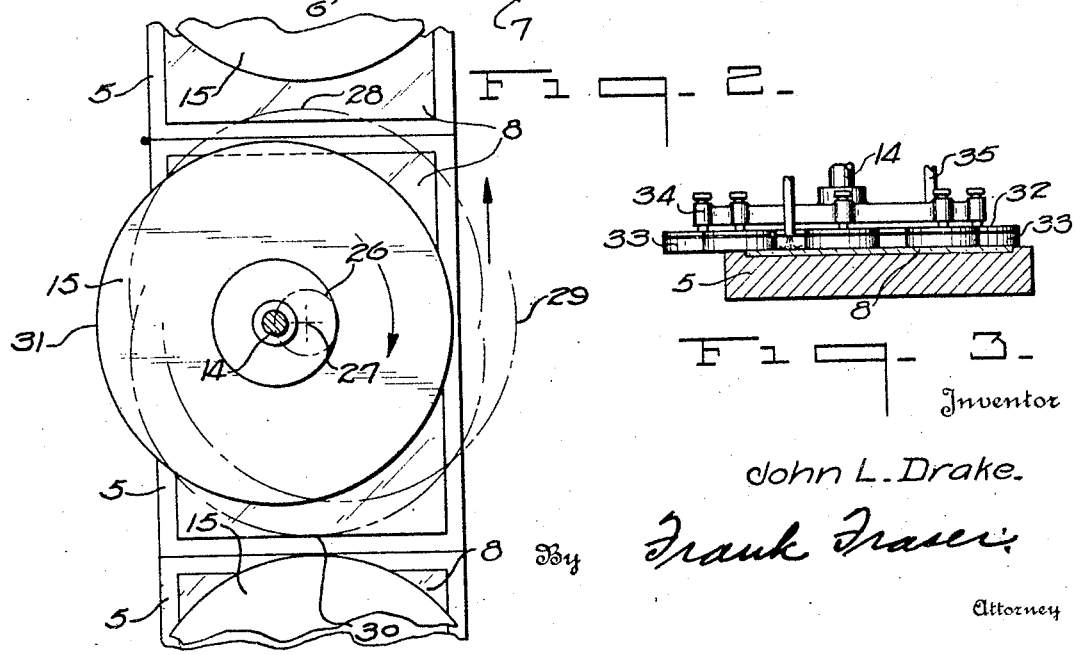
Inventor
John L. Drake.
By Frank Fraser
Attorney Patented June 24, 1930

1,767,123

UNITED STATES PATENT OFFICE

JOHN L. DRAKE, OF TOLEDO, OHIO, ASSIGNOR TO LIBBEY-OWENS GLASS COMPANY, OF TOLEDO, OHIO, A CORPORATION OF OHIO

GLASS-SURFACING APPARATUS

Application filed May 4, 1926. Serial No. 106,649.

The present invention relates to improvements in the art of surfacing glass, and more particularly to surfacing a continuously moving line of glass sheets.

An object of the present invention is to provide a rotatable glass surfacing tool with means whereby the rotation thereof will be about a continuously shifting axis.

Another object of the invention is to provide a surfacing apparatus, with means whereby the surfacing tool will have a shifting circular movement upon the surfaces of sheets of glass or other articles being surfaced.

A further object of the invention is to provide means for moving in tandem a plurality of horizontally supported glass sheets, and to further provide a gang of surfacing tools adapted to surface the sheets, with means whereby said tools may rotate and travel, while rotating, in an eccentric-like fashion upon the surface of said sheets.

A still further object of the invention is to provide a glass surfacing tool or gang of surfacing tools adapted to surface a continuous line of glass sheets, with means whereby the tool or tools may be driven about an axis, and to further provide means for driving the axis, about which said tools rotate, from one position to another, thereby causing the tools to have a shifting rotary motion upon the surface of the glass sheets.

Other objects and advantages of the invention will become apparent during the course of the following description.

In the drawings wherein like numerals are employed to designate like parts throughout the same, Fig. 1 is a section through the improved glass surfacing apparatus, namely, a grinding unit, Fig. 2 is a plan view taken substantially on line 2—2 in Fig. 1, Fig. 3 is a fragmentary view of a polishing unit, and Fig. 4 is a modified form of the invention.

In the drawings the numeral 5 refers to a plurality of trucks mounted in tandem upon a track 6, and which are adapted to be continuously moved along the track by a suitable driving mechanism 7. Upon the trucks are horizontally arranged a plurality of glass sheets 8 supported in such a manner to permit them to be surfaced, that is, after the sheets are supported upon the trucks, one side or surface thereof is ground, using an abrasive, by continuously moving the sheets from beneath one of a gang of grinding machines to another, then polished, using rouge or other polishing medium, by continuously moving them from beneath one of a gang of polishing machines to another. This side, when ground and polished, is turned over and the other side is then surfaced in the same manner.

Fig. 2 of the drawing illustrates one of a gang of surfacing machines, namely, the grinder. It is centrally mounted above the trucks 5 on a suitable foundation 9, and preferably comprises a framework 10, provided with a main center bearing 11 in which is rotatably supported a member or bushing 12. Preferably eccentrically arranged within the bushing 12 is a bearing 13 which is adapted to receive the spindle 14 of the surfacing tool 15, or as shown, a grinding runner. Abrasive 16 may be fed to the glass sheets through a suitable pipe line 17. The spindle 14 is rotatably driven, preferably through the universal joints 18 and 19 and the shaft 20 centrally mounted in a bearing 21 arranged in the top of the framework, by the bevel gears 22 and 22' which are connected to some convenient drive such as a line shaft 23. The bushing 12 is rotatably driven, and is provided with a worm gear 24 meshing with a worm 38 keyed to shaft 39 and carrying a sprocket 40 about which is trained a sprocket chain 25 also trained about a sprocket 41 keyed to the line shaft 23, or to some other convenient source of power, thus causing the eccentrically positioned spindle 14, or axis about which the surfacing tool 15 rotates, to travel in an orbit 26 about a fixed center 27. The surfacing tool 15, preferably rotating at a much faster rate of speed than that at which the member 12 rotates, will therefore complete several revolutions before reaching the extend of its positions 28, 29, 30 and 31. It may, however, be found desirable to rotate the tool and bushing at the same speed, or it may be found satisfactory to rotate the bushing at a greater speed than the tool without departing from the nature of the invention. The gang of surfacing machines are preferably arranged in groups, that is, the surfacing tools of one group of machines are adapted to rotate in the opposite direction to that of another group of tools.

Fig. 3 illustrates the type of polishing tools ordinarily used, and differs only in this respect from the balance of the surfacing apparatus shown in Fig. 1. They consist of a plurality of blocks 32 usually covered with felt pads 33, and are pivotally and floatably mounted in a spider 34, secured upon the end of the spindle 14. A suitable polishing material, such as rouge, may be fed to the glass sheets through pipes 35.

The modification shown in Fig. 4 illustrates another manner whereby the rotating surfacing tools 15 or 32 may be shifted from one position to another across the surfaces of the glass sheets 8, by oscillating the tool's axis of rotation 14, back and forth about a fixed center 36, by some suitable mechanism such as indicated by the numeral 37.

When in operation the surfacing tools are caused to bear down upon the surfaces of the glass sheets 8, passing in the direction as indicated by the arrow in Fig. 2, beneath them. Together with the linear motion of the glass sheets and the shifting circular surfacing action on the sheets, caused by the constantly shifting position of the rotating tool's axis, a greater relative motion will be permitted to develop between the glass and the tool than what has heretofore been known to exist with this method of surfacing glass. The present invention is in no way restricted to the use of the eccentric rotary motion imparted to the surfacing tool, as many other motions may be used which will produce the same or substantially the same results upon the glass being surfaced. This condition prevalent, and with the aid of a suitable surfacing material, it is believed the surfacing action on the glass will be greatly increased. Therefore, the time required for grinding and polishing a setting of glass should be proportionately reduced.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In combination in sheet glass surfacing apparatus, a table for carrying the sheets to be surfaced in a definite substantially horizontal path, a surfacing tool arranged to rest upon said sheets, a frame work having a main center bearing, a bushing journaled within said bearing above the table, a vertical spindle carrying the surfacing tool at its lower end and being journaled within the bushing eccentrically thereof, a vertical shaft centrally mounted in the top of the frame work and eccentrically arranged with relation to said spindle, a plurality of universal connections between said shaft and spindle, a worm gear carried by said bushing, a worm meshing with said worm gear, means for driving the shaft to impart rotary movement to the spindle, and operative connections between said driving means and said worm for rotating the bushing to cause a shifting circular movement of the surfacing tool upon the sheet.

2. In combination in sheet glass surfacing apparatus, a table for carrying the sheets to be surfaced in a definite substantially horizontal path, a surfacing tool arranged to rest upon said sheets, a supporting framework, a bushing journaled within the framework above the table, a vertical spindle carrying the surfacing tool at its lower end and being journaled within the bushing eccentrically thereof, a vertical shaft mounted in the framework above the spindle and eccentrically arranged with relation thereto, universal connections between the shaft and spindle, means for driving the shaft to impart rotary movement to the spindle, and operative drive connections between said driving means and said bushing for rotating the bushing to cause a shifting circular movement of the surfacing tool upon the sheet.

3. In combination in sheet glass surfacing apparatus, a table for carrying the sheets to be surfaced in a definite substantially horizontal path, a surfacing tool arranged to rest upon said sheets, a framework having a main center bearing, a bushing journaled within said bearing above the table, a vertical spindle carrying the surfacing tool at its lower end and being journaled within the bushing eccentrically thereof, a vertical shaft centrally mounted in the top of the framework and eccentrically arranged with relation to said spindle, universal connections between said shaft and spindle, means for driving the shaft to impart rotary movement to the spindle, and operated drive connections between said driving means and said bushing for rotating the bushing to cause a shifting circular movement of the surfacing tool upon the sheet.

Signed at Toledo, in the county of Lucas, and State of Ohio, this 1st day of May, 1926.

JOHN L. DRAKE.